(12) United States Patent
Kakadia et al.

(10) Patent No.: US 8,917,607 B2
(45) Date of Patent: *Dec. 23, 2014

(54) OPTIMIZED LAYER-2 NETWORK SWITCHING SYSTEMS AND METHODS

(75) Inventors: Deepak Kakadia, Union City, CA (US); Benjamin J. Parker, Foster City, CA (US); Thomas H. Tan, San Jose, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/494,981

(22) Filed: Jun. 12, 2012

(65) Prior Publication Data

US 2012/0250515 A1 Oct. 4, 2012

Related U.S. Application Data

(63) Continuation of application No. 12/545,242, filed on Aug. 21, 2009, now Pat. No. 8,199,655.

(51) Int. Cl.
*H04L 12/26* (2006.01)
*G06F 15/173* (2006.01)
*H04L 12/721* (2013.01)
*H04L 12/701* (2013.01)
*H04L 12/707* (2013.01)
*H04L 12/46* (2006.01)
*H04L 12/751* (2013.01)
*H04L 12/727* (2013.01)

(52) U.S. Cl.
CPC ............ *H04L 12/462* (2013.01); *H04L 45/26* (2013.01); *H04L 45/00* (2013.01); *H04L 45/22* (2013.01); *H04L 43/10* (2013.01); *H04L 45/02* (2013.01); *H04L 45/121* (2013.01)
USPC ........... 370/237; 370/238; 370/248; 370/252; 370/389; 709/241

(58) Field of Classification Search
USPC ......... 370/237, 238, 248, 249, 252, 389, 469; 709/239, 240, 241, 242
See application file for complete search history.

(56) References Cited

U.S. PATENT DOCUMENTS

| | | | |
|---|---|---|---|
| 5,933,425 A * | 8/1999 | Iwata ............................ | 370/351 |
| 6,473,798 B1 | 10/2002 | Grosser et al. | |
| 6,483,808 B1 * | 11/2002 | Rochberger et al. .......... | 370/238 |
| 6,538,997 B1 * | 3/2003 | Wang et al. ................... | 370/241 |
| 6,765,881 B1 * | 7/2004 | Rajakarunanayake ........ | 370/256 |
| 6,965,575 B2 * | 11/2005 | Srikrishna et al. ............ | 370/252 |
| 6,980,549 B1 | 12/2005 | Shabtay et al. | |

(Continued)

*Primary Examiner* — Candal Elpenord

(57) ABSTRACT

An exemplary method includes monitoring a performance of at least one of a plurality of layer-2 network paths connecting a layer-2 network switch device to another layer-2 network switch device and selecting an optimal one of the plurality of layer-2 network paths over which to forward data traffic based on a path selection heuristic and the monitored performance of the at least one of the plurality of layer-2 network paths. At least a portion of the exemplary method may be performed by a layer-2 network switching system. In certain embodiments, the selecting of the optimal one of the plurality of layer-2 network paths over which to forward the data traffic is based on at least one of a latency parameter, a congestion parameter, and a cost parameter associated with the at least one of the plurality of layer-2 network paths. Corresponding systems and methods are also disclosed.

21 Claims, 7 Drawing Sheets

(56) References Cited

U.S. PATENT DOCUMENTS

| | | | |
|---|---|---|---|
| 7,023,806 B1* | 4/2006 | Gunluk | 370/238 |
| 7,376,087 B2* | 5/2008 | Srikrishna | 370/238 |
| 7,502,376 B2* | 3/2009 | Vereecke et al. | 370/408 |
| 7,668,115 B2 | 2/2010 | Maruyama et al. | |
| 7,881,206 B2* | 2/2011 | St. Pierre et al. | 370/238 |
| 7,978,611 B2* | 7/2011 | Sierecki et al. | 370/238 |
| 8,289,845 B1* | 10/2012 | Baldonado et al. | 370/230 |
| 2002/0071391 A1* | 6/2002 | Ishioka | 370/238 |
| 2003/0048750 A1 | 3/2003 | Kobayashi | |
| 2004/0174815 A1* | 9/2004 | Khisti et al. | 370/235 |
| 2005/0213558 A1 | 9/2005 | Levit et al. | |
| 2005/0259589 A1* | 11/2005 | Rozmovits et al. | 370/249 |
| 2006/0018324 A1* | 1/2006 | Nisar et al. | 370/395.51 |
| 2007/0036161 A1 | 2/2007 | Mahamuni | |
| 2007/0041326 A1* | 2/2007 | Babiarz et al. | 370/237 |
| 2007/0211636 A1 | 9/2007 | Bellur et al. | |
| 2008/0019385 A1* | 1/2008 | Sultan et al. | 370/401 |
| 2008/0117829 A1* | 5/2008 | Nakano et al. | 370/247 |
| 2008/0123533 A1* | 5/2008 | Vasseur et al. | 370/238 |
| 2011/0032825 A1* | 2/2011 | Minkenberg et al. | 370/238 |

* cited by examiner

OPTIMIZED LAYER-2 NETWORK SWITCHING SYSTEMS AND METHODS

RELATED APPLICATIONS

This application is a continuation application of U.S. patent application Ser. No. 12/545,242, filed on Aug. 21, 2009, and entitled "OPTIMIZED LAYER-2 NETWORK SWITCHING SYSTEMS AND METHODS," which is hereby incorporated by reference in its entirety.

BACKGROUND INFORMATION

Communication networks provide many people and organizations with access to a variety of applications and services. A typical communication network employs a layered communication and protocol design in which each layer represents a collection of conceptually similar functions. The layers are arranged hierarchically, with each layer typically providing services to the layer above it and requesting services from the layer below it.

As an example, a typical layered design of a communication network patterned after the Open Systems Interconnection ("OSI") reference model includes a physical layer, data link layer, network layer, transport layer, session layer, presentation layer, and application layer arranged hierarchically. The physical layer, data link layer, and network layer are commonly referred to as "media layers," and the other four layers are commonly referred to as "host layers."

The physical layer includes functions concerned with interactions between network devices and a physical medium. The data link layer includes functions concerned with transfer of data traffic across physical links interconnecting network entities. The network layer includes functions for end-to-end routing (e.g., source to destination) of data traffic. Typically, the data link layer receives and responds to service requests from the network layer by issuing service requests to the physical layer for transport of data frames across physical links.

Conventionally, the data link layer is not concerned with path detection, data traffic routing, error control, quality-of-service, and other "intelligence-type" functions that are left to the network layer. To illustrate, a data link layer switch device such as a conventional Ethernet switch device typically receives a service request from the network layer and simply forwards data traffic frames associated with the request to a port that has been mapped to a destination address, such as a Media Access Control ("MAC") address, indicated in the service request. The port provides a connection to a physical link connecting the Ethernet switch device to another Ethernet switch device associated with the MAC address.

While the simple data traffic forwarding functionality of a data link layer device such as a conventional Ethernet switch device is well-suited for certain types of communication networks such as a small-scale local area network, it is problematic for other types of communication networks. For example, traditional Ethernet switch devices and protocols tend to cause congestion in optical transport networks and particularly in hybrid data link layer and optical transport network configurations. The congestion may be especially problematic when such hybrid configurations are used to transport significant loads of data traffic over large-capacity physical links and/or large geographic areas such as may be used in a backhaul network and/or a wide area network (e.g., a metro area network). To illustrate, a traditional Ethernet switch device is designed to maximize throughput over a physical link connecting two network devices. Accordingly, the Ethernet switch device will blindly forward data traffic frames over the physical link without considering the congestion, cost, or latencies associated with the link.

While the network layer is typically configured to perform path detection, data traffic routing, error control, quality-of-service ("QOS"), and other "intelligence-type" functions, such functions at the network layer do not always prevent congestion of physical links interconnecting network devices. Moreover, overhead associated with the network layer is significantly more than overhead associated with the data link layer. Thus, there is a need to optimize data traffic forwarding at the data link layer in communication networks such as optical transport networks.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
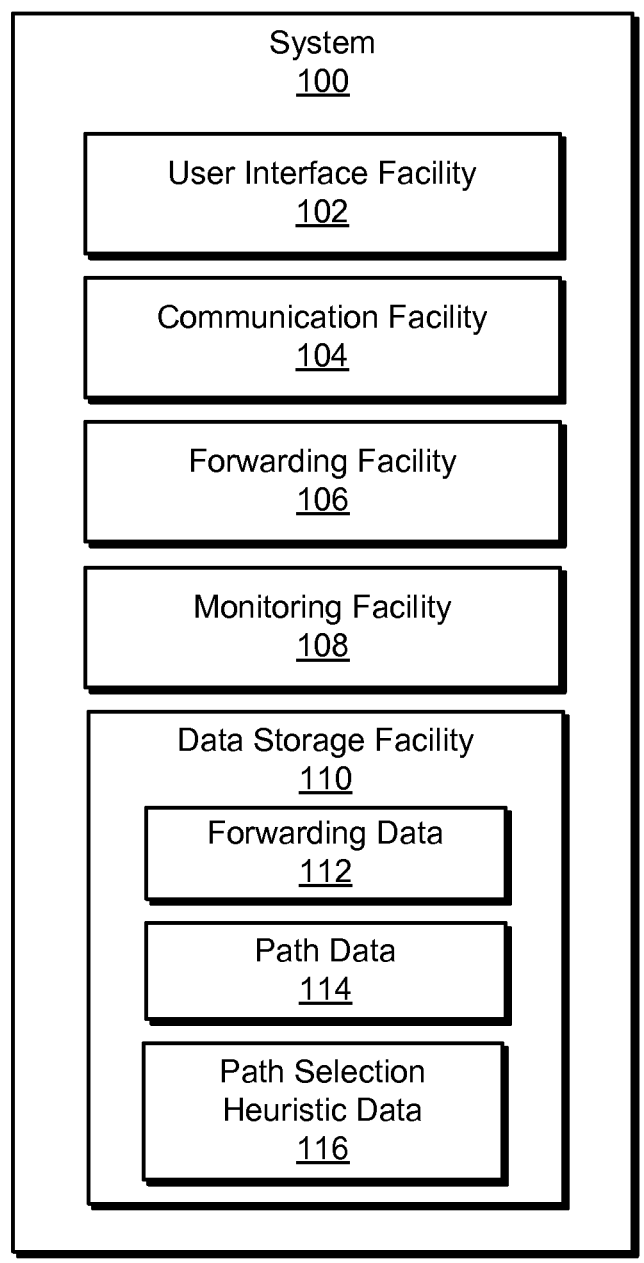
FIG. 1 illustrates an exemplary layer-2 network switching system.

Exemplary optimized layer-2 network switching systems and methods are described herein. As described herein, exemplary systems and methods may monitor a performance of at least one of a plurality of layer-2 network paths and select an optimal one of the plurality of layer-2 network paths over which to forward layer-2 data traffic based on a path selection heuristic and the monitored performance of the at least one of the plurality of layer-2 network paths. Data traffic may then be forwarded over the selected optimal layer-2 network path.

For example, an exemplary method includes monitoring a performance of at least one of a plurality of layer-2 network paths connecting a layer-2 network switch device to another layer-2 network switch device and selecting an optimal one of the plurality of layer-2 network paths over which to forward data traffic based on a path selection heuristic and the monitored performance of the at least one of the plurality of layer-2 network paths. At least a portion of the exemplary method may be performed by a layer-2 network switching system. In certain embodiments, the selecting of the optimal one of the plurality of layer-2 network paths over which to forward the data traffic is based on at least one of a latency parameter, a congestion parameter, and a cost parameter associated with the at least one of the plurality of layer-2 network paths. Corresponding systems and methods are also disclosed.

As used herein, the term "layer-2" refers to a particular layer of a layered network communication and protocol design. More specifically, the term "layer-2" may refer to a layer that interfaces with and requests services from a physical layer ("layer-1") that is responsible for interfacing directly with a physical transport medium (e.g., an optical transport medium such as optical fiber). In the Open Systems Interconnection ("OSI") reference model, for example, the term "layer-2" refers to the data link layer, which is configured to interface with and request services from the physical layer of the OSI reference model. In certain embodiments, layer-2 may refer specifically to an Ethernet layer and/or a Media Access Control ("MAC") addressing layer of a layered network communication and protocol design.

The physical transport medium with which elements of layer-1 interface may include any medium suitable for transporting data traffic. In certain embodiments, for example, the physical transport medium comprises an optical transport medium (e.g., optical fiber) such as may be employed in an optical transport network.

Layer-2 elements may be separate from or integrated with layer-1 elements. For example, layer-2 devices may be separate from layer-1 devices, or layer-2 and layer-2 elements may be integrated in a single device. In certain embodiments, layer-2 and layer-1 elements may be integrated to form a hybrid layer-2 optical transport network.

Exemplary embodiments of optimized layer-2 network switching systems and methods will now be described in more detail with reference to the accompanying drawings.

FIG. 1 illustrates an exemplary layer-2 network switching system 100 (or simply "system 100"). As will be described in more detail below, system 100 may be configured to monitor a performance of one or more layer-2 network paths and select an optimal one of the layer-2 network paths over which to forward data traffic based on a path selection heuristic and the monitored performance of the one or more layer-2 network paths.

System 100 may include, but is not limited to, a user interface facility 102, a communication facility 104, a forwarding facility 106, a monitoring facility 108, and a data storage facility 110 communicatively coupled one to another. Facilities 102-110 may be configured to perform one or more operations related to layer-2 functionality of elements of communications network, as described herein.

User interface facility 102 may be configured to provide a user interface through which a user of system 100 may provide input and receive output related to layer-2 functionality. Accordingly, a user of system 100 may input data, settings, and/or parameters to system 100 and receive output such as performance reports related to layer-2 functionality through user interface facility 102. User interface facility 102 may employ any technologies suitable for providing a user interface.

Communication facility 104 may be configured to transmit and receive communications and/or data related to layer-2 functionality. For example, communication facility 104 may send and receive inter-layer communications. Accordingly, communication facility 104 may receive and respond to service requests from a layer (e.g., a network layer ("layer-3") hierarchically above layer-2) and provide service requests to another layer (e.g., a physical layer ("layer-1") hierarchically below layer-2).

In addition, communication facility 104 may transmit and receive intra-layer communications and/or data to/from one or more layer-2 network devices over one or more layer-2 network paths and/or links interconnecting layer-2 network devices. Communication facility 104 may include any technologies suitable for transmitting and receiving layer-2 communications and/or data. In certain embodiments, communication facility 104 may be configured to interface with one or more ports of a network device, which ports may comprise ingress and/or egress ports to/from layer-2 network paths and/or links interconnecting network devices.

Forwarding facility 106 may be configured to forward layer-2 data traffic for transport over one or more layer-2 network paths and/or links. For example, forwarding facility 106 may forward data traffic to an ingress port mapped to a layer-2 network path and/or link for transport over the layer-2 network path and/or link.

In certain embodiments, forwarding facility 106 may be configured to forward data traffic based on forwarding data 112 stored in data storage facility 110. Forwarding data 112 may include any data that may be used by forwarding facility 106 to determine a forwarding destination (e.g., a forwarding address and/or port). For example, forwarding data 112 may include a traffic forwarding table including data representative of network device addresses (e.g., MAC addresses associated with network interface cards) and ports associated with the network device addresses. Accordingly, forwarding facility 106 may locate a destination network device address in the forwarding table and identify a port to which data traffic addressed to the destination network device address is to be forwarded. As described further below, in certain embodiments, a traffic forwarding table may be maintained and updated based on monitored performance of one or more layer-2 network paths.

Monitoring facility 108 may be configured to monitor a performance of at least one of a plurality of layer-2 network paths and select an optimal one of the plurality of layer-2 network paths over which to forward layer-2 data traffic based on a path selection heuristic and the monitored performance of the at least one of the plurality of layer-2 network paths. In certain examples, the selection of the optimal path may be based on path data 114 and path selection heuristic data 116 stored in data storage facility 110. Path data 114 may include any data related to one or more layer-2 network paths, including data representative of the monitored performance of one or more layer-2 network paths. In certain embodiments, path data 114 may include a path comparison table including data representative of path performance metrics. As described further below, a path comparison table may be maintained and updated based on monitored performance of one or more layer-2 network paths. Path selection heuristic data 116 may include any data representative of a path selection heuristic that may be used to select an optimal layer-2 network path over which to forward data traffic. The path selection heuristic may be defined such that a selection of an optimal layer-2 network path is based on monitored performance parameters of one or more layer-network paths. Examples of monitoring the performance of one or more layer-2 network paths and selecting an optimal one of the paths over which to forward layer-2 data traffic based on a path selection heuristic and the monitored performance of the one or more paths are described in detail further below.

Storage facility 110 may be configured to maintain forwarding data 112, path data 114, and path selection heuristic data 116. Storage facility 110 may be further configured to maintain any other data as may serve a particular application.

System 100, including facilities 102-110, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems. Moreover, it will be recognized that although facilities 102-110 are shown to be separate facilities in FIG. 1, any of those facilities may be combined into a single facility as may serve a particular application.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 2:
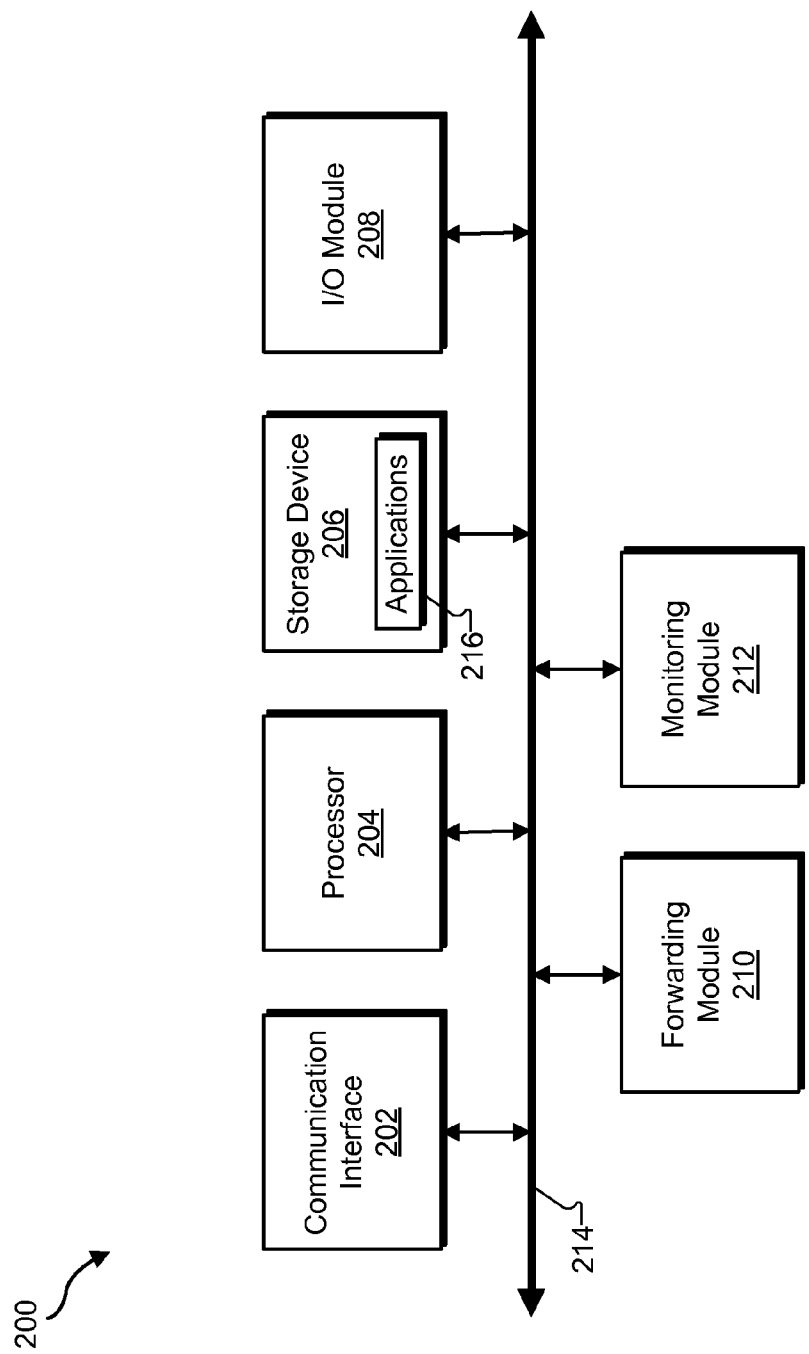
FIG. 2 illustrates an exemplary layer-2 network switch device with the system of FIG. 1 implemented thereon.

FIG. 2 illustrates components of an exemplary layer-2 network switch device 200 (or simply "device 200"), which may have system 100 implemented thereon. As shown in FIG. 2, device 200 may include a communication interface 202, a processor 204, a storage device 206, an input/output ("I/O") module 208, a forwarding module 210, and a monitoring module 212 communicatively coupled one to another by way of a communication infrastructure 214. The components of device 200 may communicate with one another, including sending data to and receiving data from one another, using any suitable communication technologies. Moreover, the components of device 200 may be implemented on any layer-2 network device, such as an Ethernet switch device, a MAC address switch device, a multi-layer switch device, an optical transport network interface device, and any other layer-2 device configured to perform one or more of the processes and/or operations described herein.

In some examples, user interface facility 102, communication facility 104, forwarding facility 106, monitoring facility 108, and/or storage facility 110 of system 100 may be implemented by or within one or more components of device 200. For example, computer-readable instructions (e.g., applications 216) residing within storage device 206 may be configured to direct processor 204 to perform one or more processes or functions associated with user interface facility 102, communication facility 104, forwarding facility 106, and/or monitoring facility 108. Likewise, storage facility 108 may be implemented by or within storage device 206.

While an exemplary device 200 is shown in FIG. 2, the components illustrated in FIG. 2 are not intended to be limiting. Additional or alternative components may be used in other embodiments. Components of the device 200 shown in FIG. 2 will now be described in additional detail.

Communication interface 202 may be configured to perform one or more of the functions of communication facility 104, including transmitting and/or receiving communications and/or data to/from non-layer-2 layers of a layered network communication and protocol design and/or to/from one or more other layer-2 network devices. Examples of communication interface 202 may include, without limitation, one or more layer interfaces, application program interfaces, interfaces (e.g., ports) to one or more layer-2 network paths and/or links, transceivers, transmitters, receivers, and any other suitable interface.

Processor 204 generally represents any type or form of processing unit capable of processing data or interpreting, executing, and/or directing execution of one or more of the instructions, processes, and/or operations described herein. Processor 204 may direct execution of operations in accordance with computer-executable instructions such as may be stored in storage device 206 or another computer-readable medium.

Storage device 206 may include one or more data storage media, devices, or configurations and may employ any type, form, and combination of data storage media and/or device. For example, storage device 206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 206.

I/O module 208 may be configured to perform one or more of the functions of user interface facility 102, including receiving input from and providing output to a user. In certain embodiments, I/O module 208 is configured to receive user input in the form of data, settings, and/or parameters related to layer-2 functionality. I/O module 208 may include any hardware, firmware, software, or combination thereof supportive of input and output capabilities.

Forwarding module 210 may be configured to perform one or more of the functions of forwarding facility 106, including forwarding layer-2 data traffic as described above.

Monitoring module 212 may be configured to perform one or more of the functions of monitoring facility 106, including monitoring performance of at least one of a plurality of layer-2 network paths connected to device 200 and selecting one of the plurality of layer-2 network paths over which to forward data traffic based on a path selection heuristic and the monitored performance. As described further below, in certain embodiments, monitoring module 212 and/or monitoring facility 108 may be configured to monitor path performance and/or select an optimal forwarding path based on monitored path performance in one or more background processes running on device 200.

Monitoring module 212 may include any hardware, computer-readable instructions, or combination thereof configured to perform one or more of the monitoring and/or selecting operations described herein. In certain embodiments, monitoring module 212 may implemented as computer-readable instructions stored in storage device 206 and configured to direct processor 204 and/or one or more other components of device 200 to perform one or more of the monitoring and/or selecting operations described herein.

Figure 3:
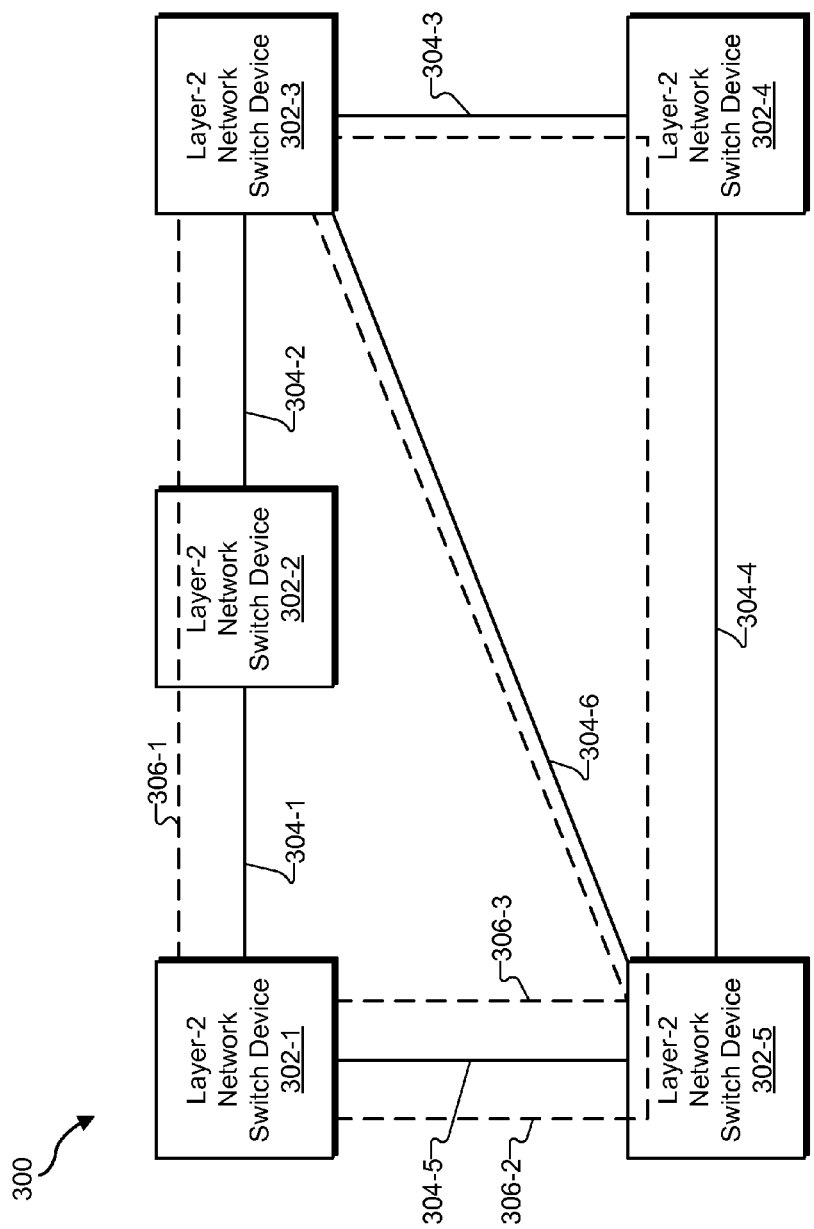
FIG. 3 illustrates an exemplary network system having a plurality of network switch devices interconnected by a plurality of links.

FIG. 3 illustrates an exemplary network system 300 (or simply "system 300") having a plurality of network switch devices interconnected by a plurality of links. One or more components of system 100 and/or device 200 may be implemented by, within, and/or across one or more of the network switch devices in system 300.

As shown in FIG. 3, system 300 may include a plurality of layer-2 network switch devices 302 (e.g., layer-2 network switch devices 302-1 through 302-5) interconnected by a plurality of links 304 (e.g., links 304-1 through 304-6). Layer-2 network switch devices 302 (or simply "devices 302") may comprise any layer-2 network devices, such as devices 200, Ethernet switch devices, MAC address switch devices, multi-layer switch devices, optical transport network interface devices, any other layer-2 devices configured to perform one or more of the layer-2 processes and/or operations described herein, or any combination or sub-combination of such devices.

In certain embodiments, devices 302 may be located at geographically remote sites interconnected by links 304 as shown in FIG. 3. For example, devices 302 may be located at various cell sites, repeater stations, and/or switching offices within a mobile phone network. As another example, devices 302 may be located at remote geographic locations and may form at least part of a wide area network (e.g., a metro area network), a backhaul network, a core transport network, or other network having geographically remote locations.

Links 304 may comprise physical links over which data traffic may be transported between devices 302. Links 304 may include or be formed by any suitable physical transport media interconnecting devices 302. In certain embodiments, links 304 may include or be formed over optical transport media such as optical fibers, Synchronous Optical Networking ("SONET") protocol connections, and/or Synchronous Digital Hierarchy ("SDH") connections interconnecting devices 302. As an example, links 304 may include or be formed over OC-48 and/or 10-Gigabit Ethernet connections. In certain examples, links 304 may comprise virtual concatenation groups ("VCGs"), which may include groupings of optical connections interconnecting certain devices 302.

Layer-2 network paths may be provisioned over one or more links 304 between devices 302 to form end-to-end layer-2 data transport connections between devices 302. As shown in FIG. 3, system 300 may include one or more provisioned layer-2 network paths 306 (e.g., layer-2 network paths 306-1 through 306-3) interconnecting one or more devices 302. The layer-2 network paths 306 (or simply "paths 306"), which are represented by dashed lines in FIG. 3, may provide end-to-end paths over which layer-2 data traffic may be transported between devices 302. In FIG. 3, layer-2 network paths 306-1, 306-2, and 306-3 provide a plurality of end-to-end paths between devices 302-1 and device 302-3. Specifically, path 306-1 spans link 304-1, device 302-2, and link 304-2 to provide an end-to-end path between device 302-1 and device 302-3, path 306-2 spans link 304-5, device 302-5, link 304-4, device 302-4, and link 304-3 to provide another end-to-end path between device 302-1 and device 302-3, and path 306-3 spans link 304-5, device 302-5, and link 304-6 to provide yet another end-to-end path between device 302-1 and device 302-3.

Paths 306 may be provisioned in any suitable way in system 300. In certain embodiments, one or more paths 306 may be manually provisioned between devices 302 using available links 304. In other embodiments, one or more paths 306 may be automatically discovered and provisioned using any suitable path discovery protocol. In certain examples, paths 306 may be provisioned as virtual local area networks ("VLANs") interconnecting devices 302. A VLAN may span one or more links 304, and a link 304 may support one or more VLANs.

In certain embodiments, system 100 may include or be implemented within an optical transport network and/or a hybrid layer-2 optical transport network. In such embodiments, links 304 may include and/or be formed over optical transport media. In some examples, devices 302 may comprise Ethernet switch devices and/or MAC addressing devices configured to forward layer-2 data traffic over links 304 and/or paths 306 as described above.

Examples of monitoring a performance of at least one of a plurality of layer-2 network paths and selecting an optimal one of the plurality of paths over which to forward data traffic based on a path selection heuristic and the monitored performance of at least one of the paths will now be described. In some of the examples described below, reference will be made to system 300 in which device 302-1 may monitor a performance of at least one of the paths 306 shown in FIG. 3 and selecting an optimal one of the paths 306 over which to forward data traffic to device 302-3 based on a path selection heuristic and the monitored performance of the path(s). Such examples are illustrative only and not limiting in any sense.

Figure 4:
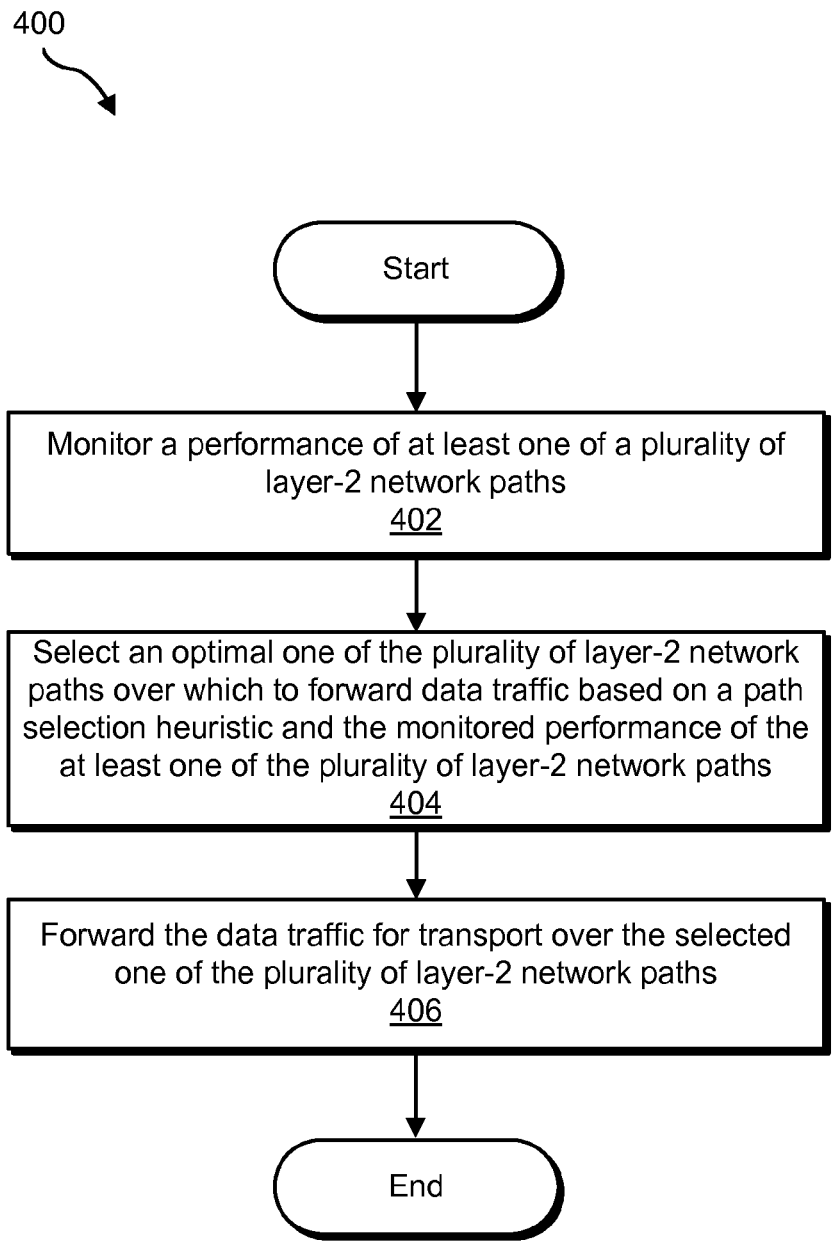
FIG. 4 illustrates an exemplary layer-2 network switching method.

FIG. 4 illustrates an exemplary optimized layer-2 network switching method 400. While FIG. 4 illustrates exemplary steps according to one embodiment, other embodiments may omit, add to, reorder, and/or modify any of the steps shown in FIG. 4. In certain embodiments, system 100, device 200, and/or one or more devices 302 may perform one or more of the steps shown in FIG. 4.

In step 402, a performance of at least one of a plurality of layer-2 network paths is monitored. For example, a performance of at least one of the paths 306 interconnecting device 302-1 and device 302-3 in FIG. 3 may be monitored.

Figure 5:
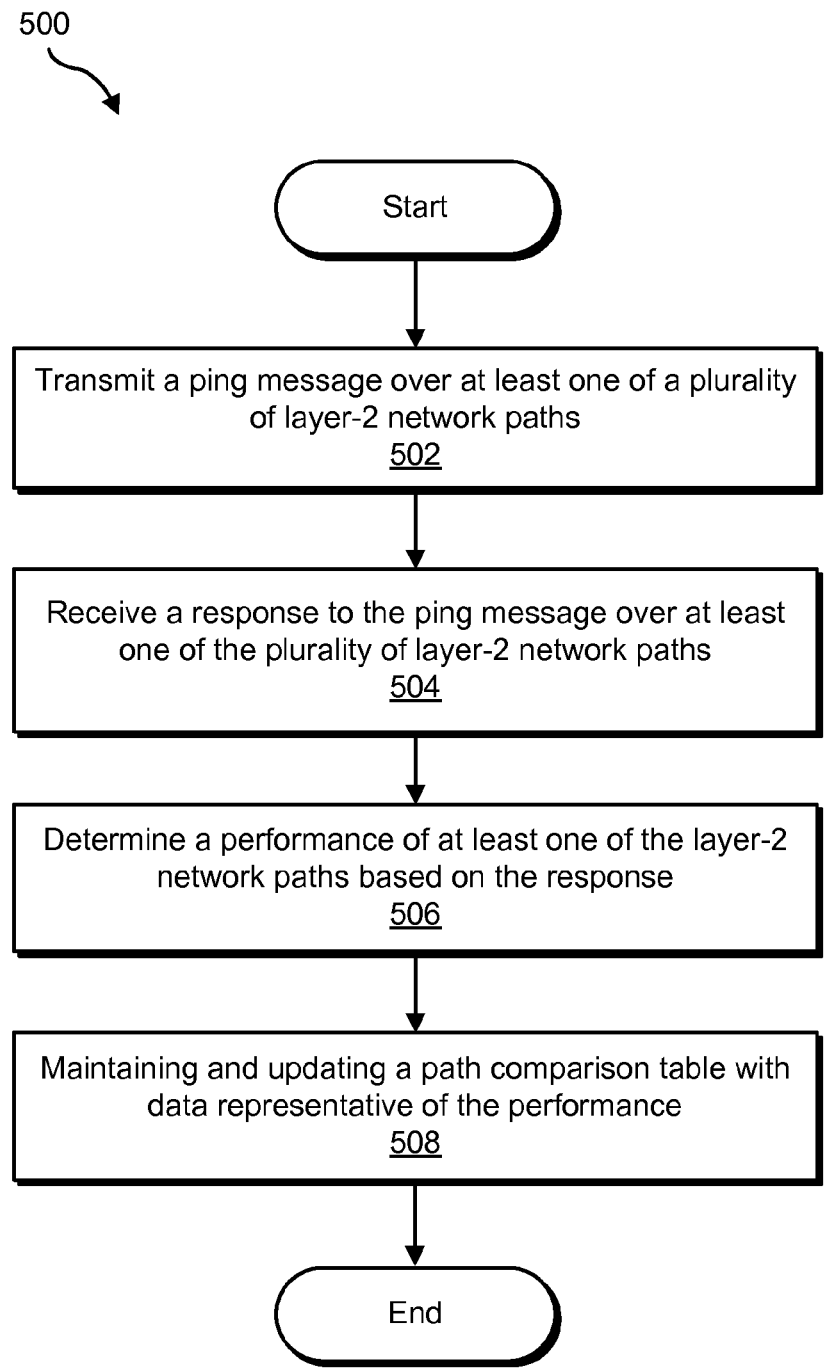
FIG. 5 illustrates an exemplary layer-2 network path performance monitoring method.

A performance of at least one of a plurality of layer-2 network paths may be monitored in any suitable way in step 402. For example, FIG. 5 illustrates an exemplary layer-2 network path performance monitoring method 500. While FIG. 5 illustrates exemplary steps according to one embodiment, other embodiments may omit, add to, reorder, and/or modify any of the steps shown in FIG. 5. In certain embodiments, system 100, device 200, and/or one or more devices 302 may perform one or more of the steps shown in FIG. 5.

In step 502, a ping message is transmitted over at least one of the plurality of layer-2 network paths. For example, a ping message may be transmitted from device 302-1 to device 302-3 over at least one of the paths 306 shown in FIG. 3. Device 302-3 may receive the ping message and transmit a response to the ping message over at least one of the paths 306. In some examples, a response to the ping message may be transmitted from device 302-3 to device 302-1 over each of the paths 306 used to transport the ping message from device 302-1 to device 302-3.

In step 504, a response to the ping message is received over at least one of the plurality of layer-2 network paths. For example, device 302-1 may receive a response to the ping message from device 302-3 over at least one of the paths 306. In some examples, device 302-1 may receive a response to the ping message over each of the paths 306 used to transmit the ping message from device 302-1 to device 302-3.

In step 506, a performance of at least one of the plurality of layer-2 network paths is determined based on the response received in step 504. For example, a performance of at least one of the paths 306 interconnecting device 302-1 and device 302-3 may be determined based on the response received in step 504. In some examples, a performance of each of the paths 306 used to transport a ping message and a response to the ping message may be determined based on the response received in step 504.

The determined performance of at least one of the plurality of layer-2 network paths may include one or more performance parameters indicative of the performance of one or more of the layer-2 network paths in transporting the ping message and/or the response to the ping message between layer-2 network devices. In certain embodiments, for example, step 506 may include determining a latency parameter and/or a congestion parameter for at least one of a plurality of layer-2 network paths. The latency parameter, which may include a queuing, transport, and/or other latency parameter, may be determined in any suitable way, such as by using timestamps included in the response to the ping message to calculate the latency parameter. The congestion parameter may also be determined in any suitable way. In certain embodiments, for example, the ping message may comprise a chain of data packets spaced apart by a transmission time interval. The response to the ping message may include timestamps associated with reception of the ping message. The receipt timestamps may be used to detect any deviation in a receipt time interval from the transmission time interval. Such a detected deviation from a transmission time interval may be used to calculate a latency parameter and/or a congestion parameter for a layer-2 network path.

As an example, device 302-1 may transmit a ping message including a chain of data packets to device 302-3 over at least one of the paths 306. Each sequential pair of the data packets may be spaced apart by a transmission time interval. Device 302-3 may receive the chain of data packets and record timestamps representative of times at which each of the data packets is received. Device 302-3 may insert the timestamp information in a response to the ping message and send the response to device 302-1 over at least one of the paths 306. The timestamp data included in the response to the ping message may be accessed and used to determine a latency parameter and/or a congestion parameter for one or more of the paths 306. For example, a latency parameter (e.g., a queuing latency parameter) and/or a congestion parameter may be determined by detecting a deviation from a transmission time interval at which a chain of data packets is spaced apart at transmission and calculating the latency parameter and/or the congestion parameter based at least in part on the detected deviation from the transmission time interval.

One or more performance parameters, such as a latency parameter and a congestion parameter may be determined in step 506 for either direction or for both directions of transport over at least one of the layer-2 network paths. For example, data associated with transport of a ping message from device 302-1 to device 302-3 may be used to determine a directional performance of a path 306 in a direction from device 302-1 to device 302-3, and transport of a response to the ping message from device 302-3 to device 302-1 may be used to determine a directional performance of the same path 306 in the opposite direction (from device 302-3 to device 302-1). Accordingly, in certain examples, bi-directional path performance parameters may be determined in step 506.

Determination of a latency parameter and/or a congestion parameter in step 506 is illustrative only. Additional and/or alternative performance parameters may be determined in other embodiments.

In step 508, a path comparison table may be maintained and updated with data representative of the performance determined in step 506. For example, monitoring facility 108 of system 100 may maintain data representative of a path comparison table in path data 114 of data storage facility 110, as mentioned above. The path comparison table may be updated to include data representative of one or more of the performance parameters determined in step 506, including latency and/or congestion parameters, for example.

Figure 6:
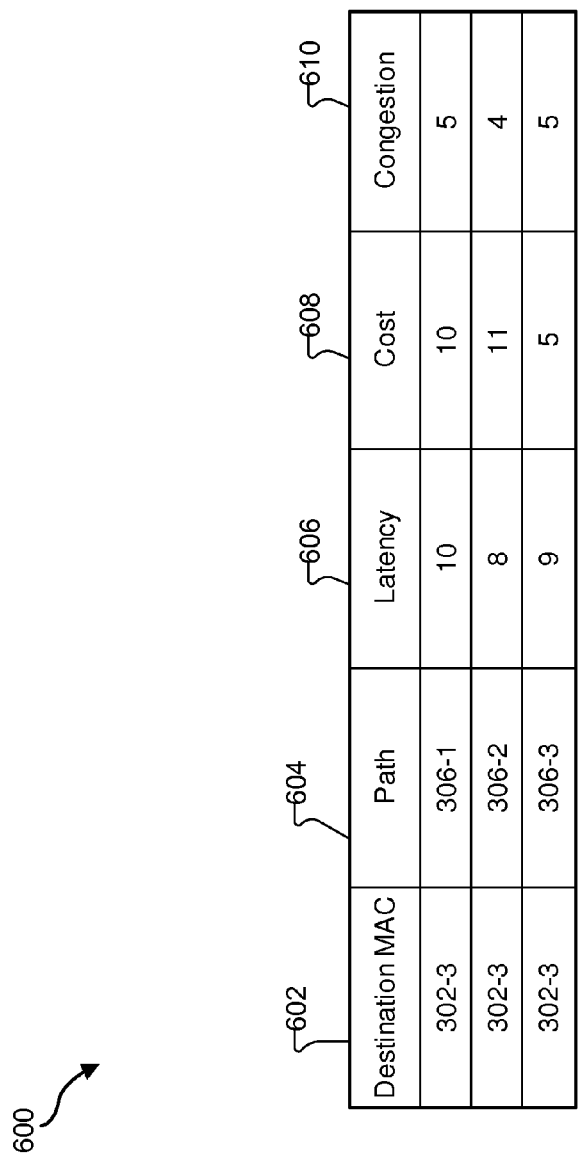
FIG. 6 illustrates an exemplary path comparison table.

In certain examples, a path comparison table may be maintained by device 302-1 and may include one or more performance parameters for one or more of the paths 306 connected to device 302-1. For example, FIG. 6 illustrates an exemplary path comparison table 600 that may be maintained by device 302-1. As shown in FIG. 6, path comparison table 600 may include a destination address column 602, a path identification column 604, a latency parameter column 606, a cost parameter column 608, and a congestion parameter column 610. Destination address column 602 may include data representative of one or more destination addresses associated with one or more layer-2 network devices such as devices 302. In FIG. 6, destination addresses in the destination address column 602 comprise MAC addresses associated with device 302-3.

Path comparison table 600 maintained by device 302-1 may include performance data for each provisioned path connected to device 302-1. As illustrated, path comparison table 600 may include a row for each of the paths 306 provisioned in system 300 and connected to device 302-1. In this particular example, each of the paths 306 is mapped to the same destination address associated with device 302-3. Accordingly, the path column 604 may include data indicating each of the paths 306-1, 306-2, and 306-3 interconnection device 302-1 and device 302-3, as shown in FIG. 6.

The latency parameter column 606 and congestion parameter column 610 include data representative of monitored performance metrics for paths 306. The values of the latency parameters and congestion parameters may be calculated based on monitored data in any suitable way and using any suitable predefined parameter calculation heuristics. In certain examples, the values of the latency parameters and the congestion parameters for paths 306 may be normalized to facilitate an unbiased comparison of the paths 306. For example, values of latency parameters may be normalized to account for differences in the number of hops spanned by each of the paths 306. As another example, values of congestion parameters may be normalized to account for differences in bandwidth capacities of paths 306. In the illustrated example, path comparison table 600 includes latency parameter values of "10," "8," and "9" and congestion parameter values of "5," "4," and "5" for paths 306-1, 306-2, and 306-3, respectively. In the illustrated example, a higher number indicates a longer latency or more congestion than that indicated by a lower number.

In certain embodiments, a path comparison table may include other parameters such as one or more cost parameters associated with layer-2 network paths. For example, path comparison table 600 in FIG. 6 includes cost parameters associated with paths 306. The cost parameter for a path 306 may represent a cost to a service provider and/or network operator (e.g., a financial cost and/or a resource cost) to forward data traffic over the path. As an example, the cost to a service provider to forward data traffic over a path owned by the service provider may be less than cost to forward data traffic over another path owned by another service provider. Cost parameter values may be defined in any suitable way, including manually by a user of system 100 through user interface facility 102. In the example shown in FIG. 6, path comparison table 600 includes cost parameter values of "10," "11," and "5" for paths 306-1, 306-2, and 306-3, respectively. In the illustrated example, a higher cost parameter value indicates a higher cost than that indicated by a lower cost parameter value.

As mentioned, a path comparison table such as path comparison table 600 may be updated in step 508 of FIG. 5. In some embodiments, at least certain updates to the path comparison table 600 may be performed dynamically in real-time or near real-time based on monitored performances of one or more layer-2 network paths for which data is maintained in the path comparison table. Accordingly, path comparison table 600 may include up-to-date performance parameters for one or more of the paths 306 connected to device 302-1 in FIG. 3.

Returning to FIG. 4, in certain embodiments, only the performance of certain selected layer-2 network paths is monitored in step 402. For example, the monitoring of layer-2 network paths may be restricted to only those paths over which data traffic is being transmitted. Thus, paths over which no data traffic is being transmitted may not be monitored. For example, device 302-1 may be configured to monitor only the paths 306 over which device 302-1 is forwarding data traffic. In other examples, device 302-1 may be configured to monitor each of the paths 306 regardless of current data traffic activity.

In step 404 of FIG. 4, an optimal one of the plurality of layer-2 network paths over which data traffic is to be forwarded is selected based on a path selection heuristic and the monitored performance of at least one of the plurality of layer-2 network paths. For example, one of the paths 306 shown in FIG. 3 may be selected as an optimal data traffic forwarding path based on a path selection heuristic and the monitored performance of at least one of the paths 306.

The path selection heuristic may specify one or more conditions to be used to determine an optimal layer-2 network data forwarding path from a plurality of layer-2 network paths. The path selection heuristic, which may be defined in any suitable way, such as by a user of system 100 through user interface facility 102, may be defined as may suit a particular implementation, data forwarding strategy, business objective, service level agreement, quality-of-service standard, etc.

In certain embodiments, the path selection heuristic may be configured to direct utilization and comparison of data in a path comparison table such as path comparison table 600. For example, parameter values for paths 306 may be compared to identify an optimal path based on the parameter values for the paths 306, including one or more of the performance parameters values (e.g., latency and/or congestion parameter values) determined in step 402. The selection performed in step 404 may be based on one or more of the parameters included in path comparison table 600. In certain embodiments, for example, a selection of an optimal path may be based on one or more latency parameters, congestion parameters, and cost parameters associated with paths 306.

As an example, a path selection heuristic may specify that latency parameters be used as the sole basis for selection of an optimal path. Under this condition, in the example shown in FIG. 6, path 306-2 would be selected as the optimal path over which to forward data traffic from device 302-1 to device 302-3. As another example, a path selection heuristic may specify that congestion parameters be used as the sole basis for selection of an optimal path. Under this condition, in the example shown in FIG. 6, path 306-2 would again be selected as the optimal path over which to forward data traffic from device 302-1 to device 302-3. However, if a path selection heuristic specified that cost parameters be used as the sole basis for selection of an optimal path, in the example shown in FIG. 6, path 306-3 would be selected as the optimal path over which to forward data traffic from device 302-1 to device 302-3.

A path selection heuristic may specify that a combination of one or more of the parameters included in a path comparison table be considered to determine an optimal data forwarding path. For example, a path selection heuristic may specify that a sum total of parameter values (e.g., latency, cost, and congestion parameter values) be calculated for each path and used to compare paths to determine which of the paths is optimal for forwarding data traffic. Using this approach, in the example shown in FIG. 6, path 306-3 would be selected as the optimal path over which to forward data traffic from device 302-1 to device 302-3.

In certain embodiments, the path selection heuristic may specify that each of the types of parameters included in a path comparison table be given even weight when selecting an optimal path. In certain other embodiments, the path selection heuristic may specify that the types of parameters included in a path comparison table be weighted differently when selecting an optimal path. For example, cost parameters may be more heavily weighted than latency and/or congestion parameters in some implementations.

In certain embodiments, the path selection heuristic may specify a prioritized order of paths and/or parameters to be considered when selecting an optimal data forwarding path. For example, path 306-3 may be a preferred path because of its relatively lower cost parameter value. Accordingly, the path selection heuristic may specify the path 306-3 be selected as long as the monitored performance of the path 306-3 satisfies a certain threshold. For example, path 306-3 may be selected as an optimal path until its congestion parameter value reaches a certain threshold, at which point, path 306-1 and/or path 306-2 may be considered and their parameter values compared to the parameter values of path 306-3 to select an optimal one of the paths 306 for forwarding data traffic.

The above-described examples of path selection heuristics and conditions that may be used when selecting an optimal data forwarding path are illustrative only. Other conditions may be specified by a path selection heuristic and considered when selecting an optimal data forwarding path based on the monitored performance of one or more paths.

In certain embodiments, the selection of an optimal path over which to forward data traffic may include updating a traffic forwarding table, such as a traffic forwarding table included in forwarding data 110 in data storage facility 110. For example, monitoring facility 108 of system 100 may insert data representative of a selected optimal path in a traffic forwarding table. To illustrate, device 302-1 may maintain a traffic forwarding table to be used to determine where to forward data traffic (e.g., over which of paths 306 to forward data traffic to device 302-3).

Step 404 may include updating the traffic forwarding table maintained by device 302-1 to include data representative of a selected optimal path over which data traffic is to be forwarded. The updating of the traffic forwarding table may configure device 302-1 to forward subsequent data traffic over the selected optimal path. In some examples, a traffic forwarding table may be dynamically updated in real-time or near real-time with data representative of up-to-date selections of an optimal data forwarding path that have been made based on monitored performance of one or more paths.

In certain embodiments, monitoring of a performance of at least one of a plurality of layer-2 network paths and selecting an optimal one of the paths may be periodically repeated. This may help ensure that an optimal path is selected based on up-to-date monitored performance data. For example, step 402 of FIG. 4 may be periodically repeated to repeatedly monitor the performance of at least one of a plurality of layer-2 network paths as described herein, and step 404 of FIG. 4 may be periodically repeated to select an optimal one of the layer-2 network paths based on up-to-date performance parameters. The periodically repeated monitoring and selecting may support dynamic updating of a traffic forwarding table as mentioned above.

In certain embodiments, monitoring of a performance of at least one of a plurality of layer-2 network paths and selecting an optimal one of the paths may be performed in one or more background processes (e.g., background daemons) running on a device (e.g., device 200 or one or more of devices 302).

For example, device 302-1 may be configured to perform one or more steps 402 and 404 of FIG. 4 in a background process running on the device 302-1. For instance, the monitoring of a performance of a lease one of the paths 306 may be performed by one or more background daemons running on device 302-1. For example, a background daemon running on device 302-1 may transmit one or more ping messages over one or more of the paths 306. Similarly, a background daemon running on device 302-1 may receive responses to the ping messages and utilized data included in the responses to determine one or more performance parameters for one or more of the paths 306. The background daemon receiving the responses to the ping messages may also be responsible for updating path comparison table 600 and/or a traffic forwarding table maintained by device 302-1, as described above.

In step 406 in FIG. 4, data traffic is forwarded for transport over the selected one of the plurality of layer-2 network paths. For example, a request to forward data traffic (e.g., a data packet) may be received by device 302-1. Device 302-1 may look to its traffic forwarding table (e.g., a lookup of the destination address) to determine over which of the paths 306 to forward the data traffic. The path indicated in the data forwarding table may represent a selected optimal path, as described above. The device 302-1 may forward the data packet out an ingress port associated with the optimal path.

Figure 7:
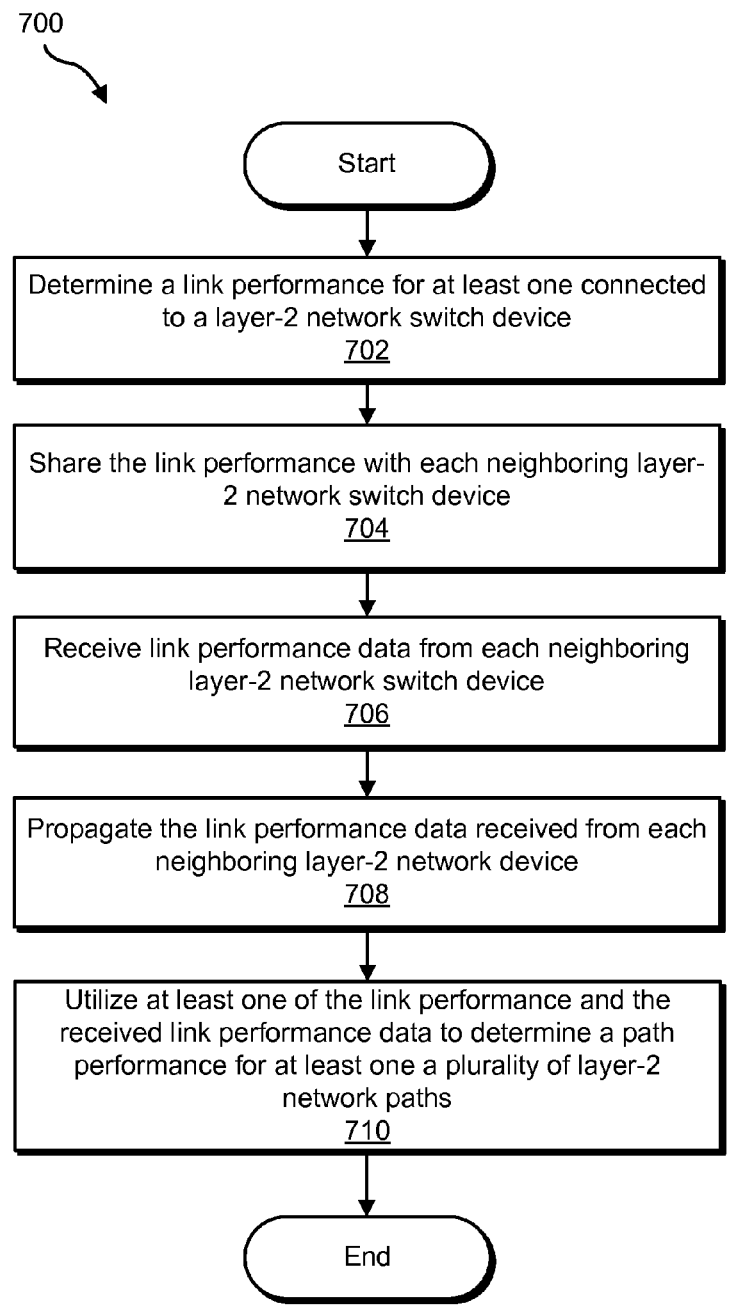
FIG. 7 illustrates an exemplary layer-2 network path performance monitoring method.

FIG. 7 illustrates another exemplary layer-2 network path performance monitoring method 700. While FIG. 7 illustrates exemplary steps according to one embodiment, other embodiments may omit, add to, reorder, and/or modify any of the steps shown in FIG. 7. In certain embodiments, system 100, device 200, and/or one or more devices 302 may perform one or more of the steps shown in FIG. 7. In certain embodiments, one or more steps of FIG. 7 may be performed as part of step 402 of FIG. 4.

In step 702, a link performance is determined for at least one link (e.g., a point-to-point link) connected to a layer-2 network switch device. The link performance may be determined in any suitable way, such as by transmitting a ping message and receiving a response to the ping message over a link connected to the layer-2 network switch device or by monitoring performance parameters of actual data traffic transported over each link connected to the layer-2 network switch device. In some examples, a link may include sub-links, and step 702 may include determining a link performance for each sub-link and/or for the sub-links as a whole.

As an example of determining a link performance, links 304 may be provisioned between devices 302 of system 300 as shown in FIG. 3. Each device 302 may maintain an address reachability matrix specifying one or more neighboring devices 302 that are connected to the device 302 by one or more of the links 304. For instance, device 302-1 may maintain an address reachability matrix specifying addresses for devices 302-2 and 302-5, which are direct point-to-point neighbors to device 302-1 and reachable from device 302-1 by way of links 304-1 and 304-5, respectively. In step 702, device 302-1 may determine a link performance (e.g., latency and/or congestion parameters) for each of the links 304-1 and 304-5 connected to device 302-1.

In step 704, the link performance determined in step 702 is shared with each neighboring layer-2 network switch device, such as by transmitting data representative of the link performance to each neighboring layer-2 network switch device over the appropriate link connected to the neighboring layer-2 switch device. For example, device 302-1 may share the link performances for links 304-1 and 304-5 with each of the devices 302-2 and 302-5 that are direct point-to-point neighbors to device 302-1. In certain embodiments, device 302-1 may also share data representative of its address reachability matrix ("address reachability data") with each of the neighboring devices 302-2 and 302-5.

In step 706, link performance data is received from each neighboring layer-2 network switch device. The link performance data may be received from each neighboring layer-2 network switch device in any suitable manner, such as over a link connected to each neighboring layer-2 network switch device. As an example, device 302-1 may receive link performance data from neighboring devices 302-2 and 302-5. The link performance data received from neighboring device 302-2 may include link performance data for each of the links 304-1 and 304-2 connected to device 302-2. Similarly, the link performance data received by device 302-1 from device 302-5 may include link performance data for each of the links 304-4 and 304-5 connected to device 302-5. In certain embodiments, device 302-1 may also receive data representative of an address reachability matrix from each of the neighboring devices 302-2 and 302-5.

In step 708, the link performance data received from each neighboring layer-2 network device is propagated. As an example, the link performance data received by device 302-1 may be propagated by device 302-1 to one or more neighboring devices 302-2 and 302-5. For instance, link performance data received by device 302-1 from device 302-2 may be propagated by device 302-1 to device 302-5. Accordingly, device 302-5 may receive link performance data for links 304 connected to either of the device 302-1 and 302-2 (e.g., links 304-1, 304-2, and 304-5). In certain embodiments, device 302-1 may propagate data representative of an address reachability matrix received from each of the neighboring devices 302-2 and 302-5.

In certain embodiments, each of the devices 302 in system 300 may be configured to share, receive, and propagate link performances and/or link performance data as described above. Link performance data may be propagated through system 100 until a convergence of link performance data is reached and detected. Convergence of link performance data may be detected in any suitable way. For example, each device 302 may be configured to determine when received link performance data contains only link performance data that is already known to the device 302 and/or contains link performance data that has been looped back to the device 302. In certain embodiments, devices 302 may be configured to cease propagating link performance data in response to a detected convergence of link performance data.

In step 710, at least one of the link performance determined in step 702 and the link performance data received at step 706 is utilized to determine a path performance (e.g., path latency and/or congestion parameters) for at least one of a plurality of layer-2 network paths. As an example, device 302-1 may utilize one or more link performances determined by device 302-1 and/or link performance data received by device 302-1 to determine a path performance for at least one of the paths 306 connecting device 302-1 to device 302-3 in system 300. The determination of a path performance may be performed in any suitable way. For example, where a layer-2 network path spans multiple links, link performance data for the links may be aggregated and/or otherwise processed to determine a path performance for the layer-2 network path. To illustrate, device 302-1 may aggregate link performance data for links 304-1 in 304-2 to determine a path performance for path 306-1. The path performance determined in step 710 may be utilized in any of the ways described above to select an optimal data forwarding path from a plurality of layer-2 network paths.

One or more of the steps 702-710 shown in FIG. 7 may be repeated periodically and/or for various layer-2 network switch devices. In certain embodiments, one or more of the steps 702-710 may be configured to be performed periodically to monitor current path performance data such that selections of optimal data traffic forwarding paths may be made based on up-to-date and/or recent performance data.

In certain embodiments, one or more link performances detected in step 702 and/or link performance data received in step 706 may be utilized to discover and provision one or more layer-2 network paths. As an example, device 302-1 may utilize link performance data, as well as shared address reachability data, to automatically discover and provision one or more end-to-end layer-2 network paths between device 302-1 and one or more other devices 302-2 through 302-5 in system 300. For instance, device 302-1 may automatically discover and provision paths 306-1, 306-2, and 306-3 connecting device 302-1 and device 302-3 based on the link performance data and/or address reachability data present at device 302-1. In other embodiments, one or more layer-2 network paths may have been previously provisioned manually and/or using an automatic path discovery protocol.

One or more of the exemplary systems and methods described herein may provide for improved resiliency, throughput, link utilization, satisfaction of service level agreements, quality of service, load balancing, reliability, efficiency, and/or scalability with respect to layer-2 traffic forwarding functionalities, devices, and/or networks. For example, by selecting an optimal traffic forwarding layer-2 network path based on monitored path performance, a layer-2 network switch device may load balance between multiple layer-2 network paths connecting to a common destination device. This may be accomplished by selecting an optimal layer-2 network path, which may result in an increase in usage of (e.g., steering traffic toward) underutilized layer-2 network paths and/or links and a decrease in usage of (e.g., steering traffic away from) overly utilized layer-2 network paths and/or links.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    monitoring, by a layer-2 network switching system, a performance of a plurality of layer-2 network paths connecting a layer-2 network switch device to another layer-2 network switch device, the performance of the plurality of layer-2 network paths including a latency parameter and a congestion parameter for each of the plurality of layer-2 network paths; and
    selecting, by the layer-2 network switching system, an optimal one of the plurality of layer-2 network paths over which to forward data traffic based on a comparison of sums of parameter values for the plurality of layer-2 network paths, the sums including a calculated sum total of a financial cost parameter value, a latency parameter value for the monitored latency parameter, and a congestion parameter value for the monitored congestion parameter for each of the plurality of layer-2 network paths.

2. The method of claim 1, further comprising forwarding, by the layer-2 network switching system, the data traffic out an ingress port of the layer-2 network switch device for transport to the another layer-2 network switch device over the selected one of the plurality of layer-2 network paths.

3. The method of claim 1, wherein the monitoring comprises:
    transmitting a ping message from the layer-2 network switch device to the another layer-2 network switch device over each of the plurality of layer-2 network paths;
    receiving a response to the ping message from the another layer-2 network switch device over each of the plurality of layer-2 network paths; and
    determining the latency parameter and the congestion parameter of each of the plurality of layer-2 network paths based on the response.

4. The method of claim 3, wherein:
    the ping message comprises a chain of data packets spaced apart by a transmission time interval; and
    the determining of the congestion parameter includes detecting a deviation from the transmission time interval in the response to the ping message and calculating the congestion parameter based at least in part on the detected deviation.

5. The method of claim 1, further comprising:
    maintaining, by the layer-2 network switching system, data representative of a traffic forwarding table;
    wherein the selecting of the optimal one of the plurality of layer-2 network paths over which to forward the data traffic comprises inserting data representative of the optimal one of the plurality of layer-2 network paths in the traffic forwarding table; and
    forwarding, by the layer-2 network switching system, the data traffic to the optimal one of the plurality of layer-2 network paths based on the data representative of the optimal one of the plurality of layer-2 network paths included in the traffic forwarding table.

6. The method of claim 1, further comprising maintaining, by the layer-2 network switching system, data representative of a path comparison table, the path comparison table including at least one performance parameter representative of the monitored performance of the plurality of layer-2 network paths, wherein the at least one performance parameter comprises the latency parameter and the congestion parameter for each of the plurality of layer-2 network paths.

7. The method of claim 6, wherein the path comparison table further includes the financial cost parameter associated with each of the plurality of layer-2 network paths.

8. The method of claim 1, wherein:
    the layer-2 network switch device comprises an Ethernet switch device within an optical transport network; and
    the monitoring and the selecting are performed within a background process running on the Ethernet switch device.

9. The method of claim 1, wherein the monitoring comprises:
    determining a link performance for at least one link connected to the layer-2 network device; and
    sharing the link performance with each layer-2 network device neighboring the layer-2 network device.

10. The method of claim 9, wherein the monitoring further comprises:
- receiving link performance data from the each layer-2 network device neighboring the layer-2 network device; and
- propagating the link performance data received from the each layer-2 network device neighboring the layer-2 network device.

11. The method of claim 10, wherein the monitoring further comprises utilizing at least one of the link performance for the at least one link connected to the layer-2 network device and the received link performance data to determine the latency parameter and the congestion parameter of each of the plurality of layer-2 network paths.

12. The method of claim 11, further comprising utilizing, by the layer-2 network switching system, the link performance data and shared address reachability data to automatically discover and provision the plurality of layer-2 network paths.

13. The method of claim 1, tangibly embodied as computer-executable instructions on at least one non-transitory computer-readable medium.

14. The method of claim 1, wherein the financial cost parameter represents a financial cost to forward the data traffic over each of the plurality of layer-2 network paths.

15. The method of claim 1, wherein the latency parameter value is normalized to account for differences in number of hops spanned by each of the plurality of layer-2 network paths.

16. The method of claim 1, wherein the congestion parameter value is normalized to account for differences in bandwidth capacities of the plurality of layer-2 network paths.

17. A system comprising:
- a monitoring facility configured to
  - monitor a performance of a plurality of layer-2 network paths connecting a layer-2 network switch device to another layer-2 network switch device, the performance of the plurality of layer-2 network paths including a latency parameter and a congestion parameter for each of the plurality of layer-2 network paths, and
  - select an optimal one of the plurality of layer-2 network paths over which to forward data traffic based on a comparison of sums of parameter values for the plurality of layer-2 network paths, the sums including a calculated sum total of a financial cost parameter value, a latency parameter value for the monitored latency parameter, and a congestion parameter value for the monitored congestion parameter for each of the plurality of layer-2 network paths; and
- a forwarding facility communicatively coupled to the monitoring facility and configured to forward the data traffic to the selected one of the plurality of layer-2 network paths for transport from the layer-2 switch device to the another layer-2 switch device.

18. The system of claim 17, wherein the monitoring facility is configured to monitor the performance of the at least one of the plurality of layer-2 network paths by
- transmitting a ping message from the layer-2 network switch device to the another layer-2 network switch device over each of the layer-2 network paths,
- receiving a response to the ping message from the another layer-2 network switch device over each of the layer-2 network paths, and
- determining the performance of each of the layer-2 network paths based on the response.

19. A system comprising:
- a first layer-2 network switch device; and
- a second layer-2 network switch device connected to the first layer-2 network switch device by a plurality of layer-2 network paths;
- wherein the first layer-2 network switch device is configured to
  - monitor a performance of each of the layer-2 network paths, the performance of the layer-2 network paths including a latency parameter and a congestion parameter for each of the plurality of layer-2 network paths,
  - select an optimal one of the layer-2 network paths through which to forward data traffic to the second layer-2 network switch device based on a comparison of sums of parameter values for the plurality of layer-2 network paths, the sums including a calculated sum total of a financial cost parameter value, a latency parameter value for the monitored latency parameter, and a congestion parameter value for monitored congestion parameter for each of the layer-2 network paths, and
  - forward the data traffic to the second layer-2 network switch device over the selected optimal one of the layer-2 network paths.

20. The system of claim 19, wherein the first layer-2 network switch device and the second layer-2 network switch device each comprises at least one of an Ethernet switch device and a Media Access Control ("MAC") addressing device within an optical transport network.

21. The system of claim 19, wherein:
- the latency parameter value is normalized to account for differences in number of hops spanned by each of the plurality of layer-2 network paths; and
- the congestion parameter value is normalized to account for differences in bandwidth capacities of the plurality of layer-2 network paths.

* * * * *